(12) United States Patent
Gauria et al.

(10) Patent No.: US 10,846,364 B1
(45) Date of Patent: *Nov. 24, 2020

(54) GENERALIZED DOT PRODUCT FOR COMPUTER VISION APPLICATIONS

(71) Applicant: Ambarella International LP, Santa Clara, CA (US)

(72) Inventors: Sameer M. Gauria, Ithaca, NY (US); Peter Verplaetse, Redwood City, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,883

(22) Filed: Jul. 30, 2019

Related U.S. Application Data

(63) Continuation of application No. 15/444,641, filed on Feb. 28, 2017, now Pat. No. 10,409,887.

(51) Int. Cl.
*G06F 13/00* (2006.01)
*G06F 13/28* (2006.01)
*G06F 17/16* (2006.01)
*G06F 12/02* (2006.01)
*G06F 12/06* (2006.01)
*G06F 7/523* (2006.01)

(52) U.S. Cl.
CPC .............. *G06F 17/16* (2013.01); *G06F 7/523* (2013.01); *G06F 12/0207* (2013.01); *G06F 12/0646* (2013.01); *G06F 2212/2515* (2013.01)

(58) Field of Classification Search
CPC .. G06F 12/0207; G06F 12/0646; G06F 17/16; G06F 2212/2515; G06F 7/523; G06F 7/5443
See application file for complete search history.

(56) References Cited

U.S. PATENT DOCUMENTS

2013/0114739 A1    5/2013    Saxena    .................... 375/240.24

*Primary Examiner* — Yong J Choe
(74) *Attorney, Agent, or Firm* — Christopher P. Maiorana, PC (57) ABSTRACT

An apparatus includes a memory and a circuit coupled to the memory. The memory may be configured as a local buffer to store all or a portion of a first array of values and all or a portion of a second array of values. The circuit may be configured to (i) calculate an intermediate array of values by multiplying a converted version of the first array by a converted version of the second array and (ii) calculate an output array comprising a plurality of output values based on values of the intermediate array and a predefined dimensional reduction.

20 Claims, 9 Drawing Sheets

GENERALIZED DOT PRODUCT FOR COMPUTER VISION APPLICATIONS

This application relates to U.S. Ser. No. 15/444,641, filed Feb. 28, 2017, which is incorporated by reference in its entirety.

FIELD OF THE INVENTION

The invention relates to computer vision generally and, more particularly, to a method and/or apparatus for implementing a generalized dot product for computer vision applications.

BACKGROUND

Using a standard dot product to calculate a projection of a vector or just sum the terms of a vector is a common operation. Matrix multiplication to transform vector spaces is also a common operation. A conventional approach implements separate operations for dot-product, matrix multiplication and various other array operations, which is inefficient.

It would be desirable to implement a generalized dot product for computer vision applications.

SUMMARY

The invention concerns an apparatus including a memory and a circuit coupled to the memory. The memory may be configured as a local buffer to store all or a portion of a first array of values and all or a portion of a second array of values. The circuit may be configured to (i) calculate an intermediate array of values by multiplying a converted version of the first array by a converted version of the second array and (ii) calculate an output array comprising a plurality of output values based on values of the intermediate array and a predefined dimensional reduction.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a generalized dot product for computer vision applications that may (i) use a local buffer to reduce bandwidth, (ii) upconvert arrays to match dimensions, (iii) perform upconversion by modifying coordinates while fetching data, (iv) implement a matrix multiplication operation, (v) implement a multi-dimensional (ND) generalized dot-product operation, (vi) allow operands to be represented as dense arrays, (vii) allow operands to be represented as sparse arrays, (viii) provide a simple technique to speed up sparse array multiplication, (ix) be implemented as part of a camera system on chip (SoC) and/or (x) be implemented as one or more integrated circuits.

Computer vision systems may utilize array calculations (e.g., sum of product of signals, etc.) in template matching, feature detection, image filtering, etc. An example of an array calculation frequently used in computer vision systems is a dot (or inner) product between two arrays (e.g., vectors, tensors, etc.), where the computer vision system treats image portions as multi-dimensional arrays of values. A dot product between two vectors (1-dimensional arrays) yields a scalar. A dot product between a tensor (2-dimensional array) and a vector yields a vector. A double dot product between two tensors yields a scalar.

An example of a standard dot product between two vectors may be expressed by the following Equation 1:

$$F(n) \cdot G(n) = \sum_{i=0}^{n-1} fi \cdot gi. \quad \text{EQ. 1}$$

A standard matrix multiplication may be expressed by the following Equation 2:

$$A(m \times n) * B(n \times k) \rightarrow C(m \times k), \quad \text{EQ. 2}$$

where k, m, and n are integers. To multiply A and B, rows of A are multiplied with columns of B and the products are summed up to produce entries of C. Standard matrix multiplication is, inter-alia, two-dimensional (2D) and matrix specific, and has asymmetry between how A and B are processed.

In computer vision applications, an efficient and versatile solution to calculate a generalized dot product that captures both a standard dot product and specialized array operations like matrix multiplication would be desirable. In various embodiments, a hardware implementation is provided that facilitates an efficient and versatile solution of both a standard dot product and specialized array operations like matrix multiplication in a computer vision system. The hardware implementation also provides a simple technique to speed up sparse vector (or array) multiplication. In a sparse formatted vector (or array), zero values of the vector (or array) are replaced by a count of the number of zeroes between successive non-zero elements.

In various embodiments, a generalized multi-dimensional (ND) dot-product operation may be implemented as a two step process, where a first step comprises multiplication and a second step comprises reduction. In an example, a generalized ND dot-product operation may be performed using two ND arrays (e.g., A and B) of arbitrary (but equal) dimensions. In various embodiments, the two ND arrays may be created from arbitrary (but unequal) dimension arrays using an optional upconversion technique (illustrated below). In the first step, each entry of the first array A is multiplied with a corresponding entry of a second array B. In the second step, the results of the first step are summed out over the lowest 1, 2, 3, . . . , or N dimensions to obtain an N−1, . . . , 3, 2, 1, or 0 dimensional result. The generalized ND dot-product operation in accordance with an embodiment of the invention subsumes the standard 1D dot product, and extends the 1D dot product to higher dimensions.

In various embodiments, the generalized multi-dimensional (ND) dot-product operation described herein generalizes the standard dot product in two ways: (i) input operands are allowed to be larger than 1-dimensional arrays (e.g., N-dimensional arrays) and (ii) reduction of more than 1 dimension is allowed by reducing the lower M dimensions (with N≥M≥1). After optional upconversion and dimensional transposition both input operands are N-dimensional arrays with identical size along all corresponding N dimensions. For example, if the input operands are two 3-dimensional arrays of size (p×q×r), then the dot product can be applied on each corresponding row of both operands. The resulting scalar values can then be combined into a 2-dimensional array of size (p×q). In the case where N=M=2, the generalized N-dimensional dot product in accordance with an embodiment of the invention corresponds to the double-dot product between two second order tensors (except in the case of tensors one of the operands is transposed).

The generalized N-dimensional dot-product operation may be extended further by removing the constraint that A and B have the same dimension in a restricted way. In various embodiments, if any dimension is of size 1 in A (or B), but size greater than 1 in B (or A), then the smaller dimension may be "upconverted" to the larger size by replication. An example of a generalized N-dimensional dot-product operation in accordance with an embodiment of the invention may be illustrated by application to the standard matrix multiplication case (EQ. 2 above) as follows: A(m×n) may be represented as a 3D array of size m×1×n and B(n×k) may be represented as a 3D array of size 1×k×n (transposed).

A generalized multi-dimensional dot-product process in accordance with an embodiment of the invention may be applied by first converting both arrays A and B to size m×k×n (e.g. by replication). The generalized multi-dimensional dot-product process may then multiply the upconverted arrays A and B together. The generalized multi-dimensional dot-product process may then sum out the products over the lowest dimension to obtain the result array C of size m×k. In general, the transposition and dimensional rearrangement described above may be done very efficiently by modifying addresses while accessing the operand data, and does not need any actual data rearrangement.

In various embodiments, the operands in the multiplication step may be represented as dense arrays (e.g., all elements are present), sparse arrays (e.g., only non-zero elements and counts of zero elements are present), or any combination thereof. Dense arrays may be accessed in streaming order or with random access. Random access allows unrestricted upconversion. Sparse arrays may only be accessed in streaming order and, therefore, only allow limited upconversion. Data may be loaded into a local buffer to save system bandwidth. Data fetched into the local buffer may be accessed multiple times, which reduces accesses (bandwidth) to the outside system. The upconversion of the arrays does not need any actual work, but can be implemented by modifying coordinates while fetching data, and in many cases the data will already be in the local buffer.

For non-sparse (dense) array cases, the reduction step may be implemented in two different ways, a tiled mode and a streaming mode. In the tiled mode, the output may be calculated tile by tile. The tiled mode is generally advantageous in that the input bandwidth is reduced for the common case where some of the input dimensions are upconverted (e.g., in matrix multiplication). In an example, an output tile of size u*v would use an input slice of an array with dimensions like u*v*W (depending on the specific reduction desired). In an example, input tiles of the form u*v*1 may be fetched and all the elements of an output tile accumulated together. The tiled mode is useful to produce output in a tiled manner, and have the flexibility to fetch the input in arbitrary order. However, the tiled mode uses random access and, therefore, prevents streaming application.

To support a dense streaming mode and still allow calculation of multiple products in parallel (e.g., for increased performance), an adder tree may be used before accumulating the values into a single output element. In the streaming mode, the output is calculated element by element, and the reduction proceeds in raster scan order. The streaming mode is useful for cases where the input needs to be streamed in.

A sparse streaming mode, where one of the operands is a sparse array, may also be implemented. The main difference between dense and sparse streaming is that one of the operand arrays (A or B) is sparse, and only the non-zero values of the sparse array are processed. This requires random access from a local buffer that holds part of the dense operand, since only the corresponding non-zero values of the dense array need to be fetched. In various embodiments, all or a portion of the non-sparse (dense) array (e.g., B) may be stored locally (e.g., in the local buffer). Then only coefficients of the sparse array (e.g., A) that are non-zero are processed by reading the corresponding elements of array B directly from the local buffer.

Figure 1:
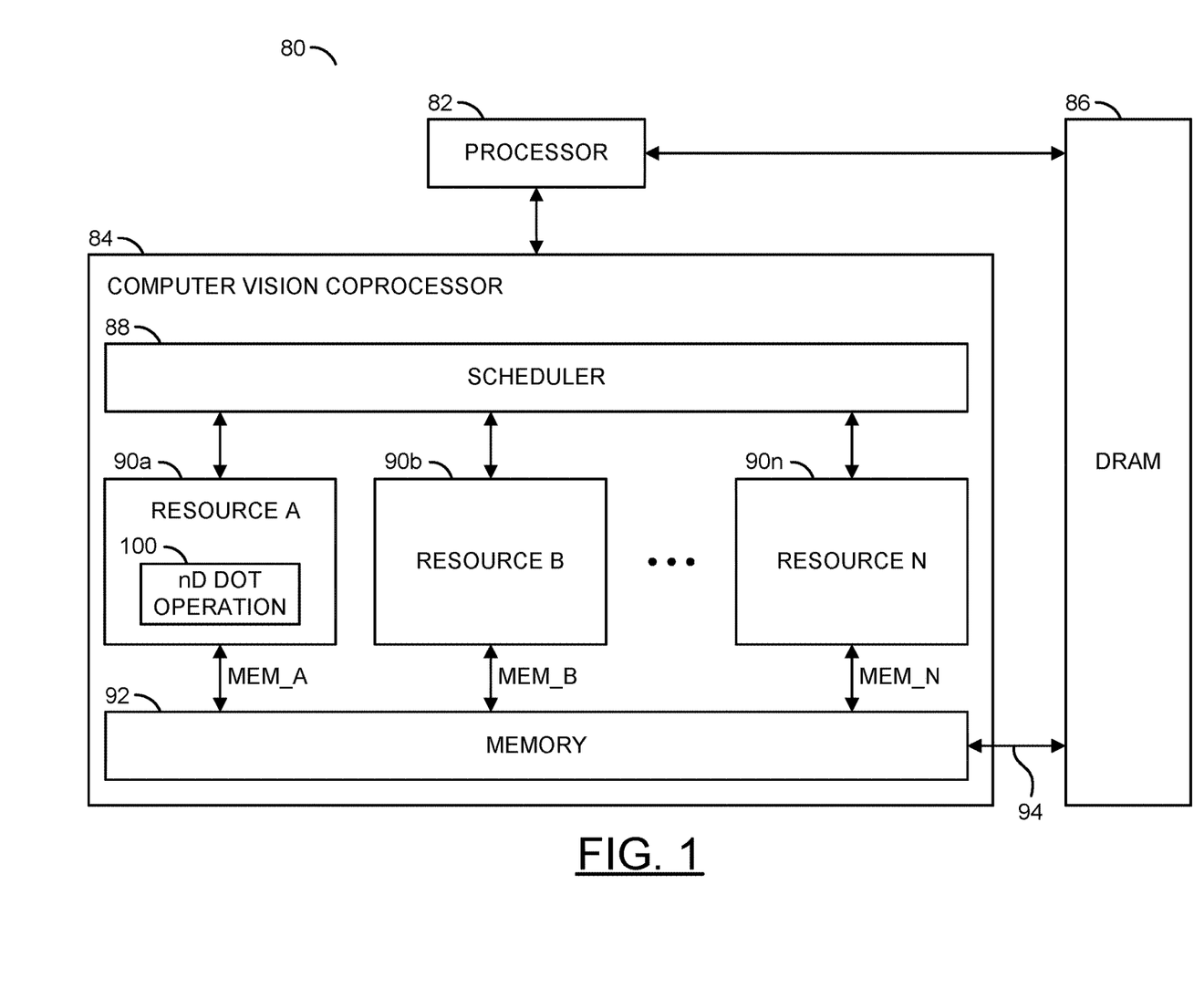
FIG. 1 is a diagram illustrating a context in which a generalized dot-product operation in accordance with an example embodiment of the invention may be implemented.

Referring to FIG. 1, a diagram of a system 80 is shown illustrating a context in which a multi-dimensional (ND) dot product operation may be implemented in accordance with an example embodiment of the invention. The system (or apparatus) 80 may be implemented as part of a computer vision system (described below in connection with FIG. 9). In various embodiments, the system 80 may be implemented as part of a camera, a computer, a server (e.g., a cloud server), a smart phone (e.g., a cellular telephone), a personal digital assistant, or the like.

In various embodiments, the system 80 may implement a generalized multi-dimensional (ND) dot-product operation (e.g., a matrix multiplication operation, etc.) utilizing hardware including a controller, a local input buffer, a set of multiply/accumulators, an adder tree and a local output buffer. The use of a local buffer generally saves bandwidth. In an example, data fetched into the local buffer may be accessed multiple times instead of performing multiple fetches to an external memory, which reduces accesses (bandwidth) to the outside system. Operand arrays may be upconverted without needing any actual work, by modifying coordinates while fetching data. In many cases, the data will already be available in the local buffer. For non-sparse (dense) array cases, the reduction step may be implemented in two different ways. In a streaming mode, the output may be calculated element by element, and the reduction performed in raster scan order. In a tiled mode, the output may be calculated tile by tile.

In an example embodiment, the system 80 comprises a block (or circuit) 82, a block (or circuit) 84, and a block (or circuit) 86. The circuit 84 generally comprises a block (or circuit) 88, one or more blocks (or circuits) 90a-90n, and a block (or circuit) 92. One or more of the circuits 90a-90n (e.g., circuit 90a as shown) generally comprises a block (or circuit) 100. In various embodiments, the circuit 100 may be configured to implement and/or perform generalized ND dot-product operations in accordance with an example embodiment of the invention.

The circuit 82 may implement a processor circuit. In some embodiments, the processor circuit 82 may be a general purpose processor circuit. The processor circuit 82 may be operational to interact with the circuit 84 and the circuit 86 to perform various computer vision tasks.

The circuit 84 may implement a coprocessor circuit. In some embodiments, the coprocessor circuit 84 may be computer vision coprocessor circuit 84. The coprocessor circuit 84 is generally operational to perform specific computer vision tasks as arranged (scheduled) by the processor circuit 82.

The circuit 86 may implement a dynamic random access memory (DRAM). The DRAM circuit 86 is generally operational to store multidimensional arrays of input data and various forms of output data. The DRAM circuit 86 may exchange the input data and the output data with the processor circuit 82 and the coprocessor circuit 84.

The circuit 88 may implement a scheduler circuit. The scheduler circuit 88 is generally operational to schedule tasks among the circuits 90a-90n to perform a variety of computer vision tasks as defined by the processor circuit 82. Individual tasks may be allocated by the scheduler circuit 88 to the circuits 90a-90n.

Each of the circuits 90a-90n may implement a processing resource (or engine). The resource circuits 90a-90n are generally operational to perform specific processing tasks. In some configurations, the resource circuits 90a-90n may operate in parallel, and independently of each other. In other configurations, the resource circuits 90a-90n may operate collectively among each other to perform allocated tasks. The resource circuits 90a-90n may be homogenous processing resources (all circuits 90a-90n may have the same capabilities) or heterogeneous processing resources (two or more circuits 90a-90n may have different capabilities). In various embodiments, the resource circuits 90a-90n may be implemented solely as hardware circuits.

The circuit 92 may implement a memory circuit. The memory circuit 92 is generally operational to store portions of the multidimensional arrays of input data and output data generated by the resource circuits 90a-90n. The input data may be received from the DRAM circuit 86 via a memory bus 94. The output data may be sent to the DRAM circuit 86 via the memory bus 94.

The circuit 100 may implement a generalized dot-product operation (e.g., a dot or inner product, matrix multiplication, etc.) in accordance with an example embodiment of the invention. The generalized dot-product operation circuit 100 is generally operational to fetch a plurality of operand data arrays from the memory circuit 92. Each data array generally comprises a plurality of the data values. The generalized dot-product operation circuit 100 may also be operational to calculate a plurality of array values by multiplying and summing data values to generate a corresponding output data array. The generalized dot-product operation circuit 100 may be in communication with the memory circuit 92 (e.g., via a bus MEM_A) to receive the input data and present the output data. In various embodiments, the generalized dot-product operation circuit 100 may be implemented solely in hardware circuitry. The circuit 100 provides high efficiency by having a combined implementation for dot product, matrix multiplication and various other array operations. The combined implementation extends to a simple way to speed up sparse multiplication.

Figure 2:
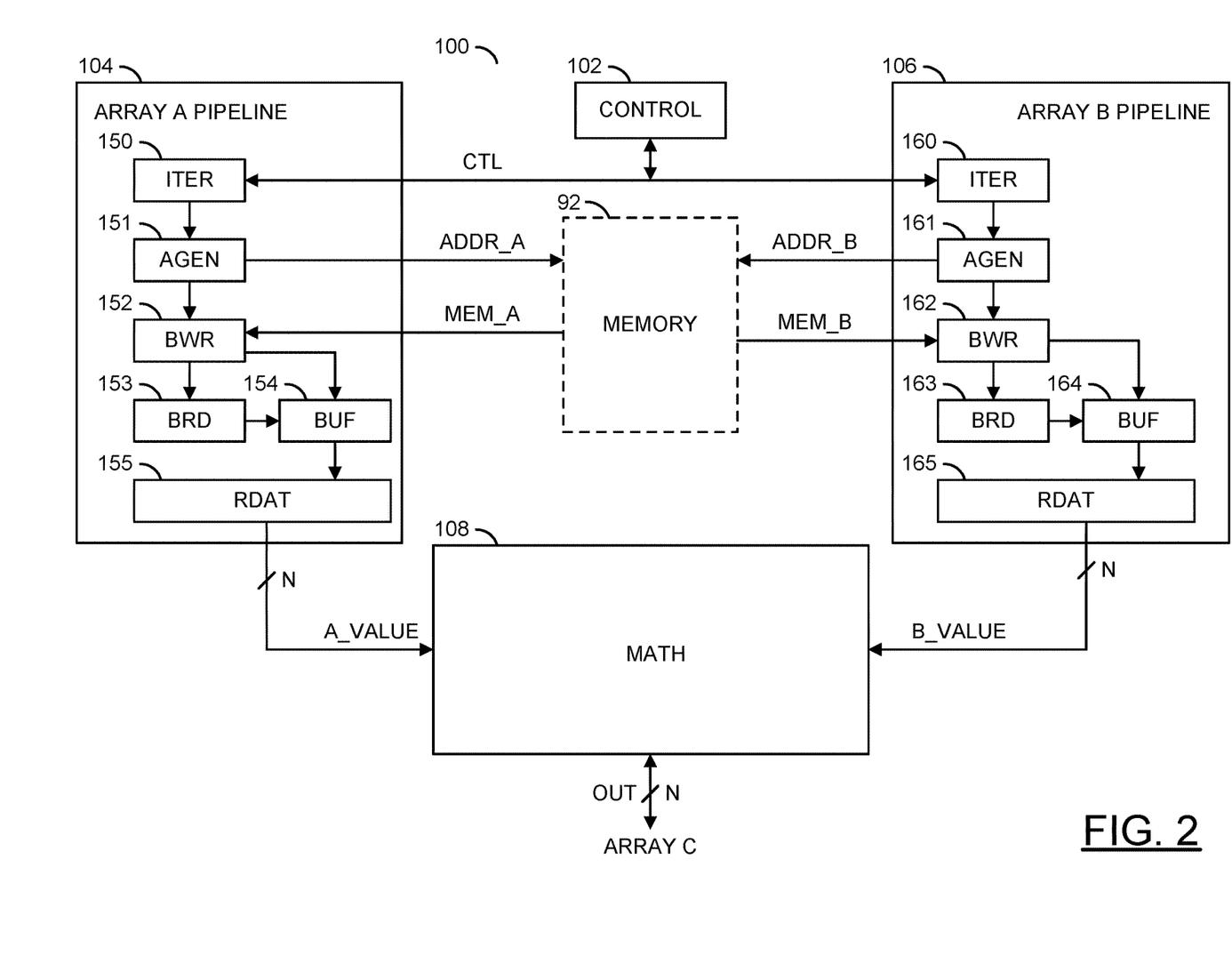
FIG. 2 is a diagram illustrating an example implementation of a generalized dot-product operation circuit of FIG. 1.

Referring to FIG. 2, a diagram illustrating an example implementation of the generalized dot-product operation circuit 100 of FIG. 1 is shown in accordance with an embodiment of the invention. The generalized dot-product operation circuit 100 generally comprises a block (or circuit) 102, a block (or circuit) 104, a block (or circuit) 106, and a block (or circuit) 108. In various embodiments, the circuits 102-108 are implemented solely in hardware. The circuit 102 may implement a control circuit. The circuit 104 may implement a first array pipeline (e.g., ARRAY A PIPELINE). The circuit 106 may implement a second array pipeline (e.g., ARRAY B PIPELINE). The circuit 108 may implement a mathematical calculation circuit.

A signal (e.g., CTL) may be exchanged among the circuit 102, the circuit 104 and the circuit 106. The signal CTL may convey control information. A signal (e.g., ADDR_A) may be generated by the circuit 104 and presented to the memory circuit 92. The signal ADDR_A may carry address information used to read the input data values for a first operand array (e.g., array A). A signal (e.g., ADDR_B) may be generated by the circuit 106 and received by the memory circuit 92. The signal ADDR_B may convey address information used to read input data values for a second operand array (e.g., array B). The signal MEM_A may be received by the circuit 104. The signal MEM_B may be received by the circuit 106. The signal MEM_A received by the circuit 104 may carry the input data values of the operand array A. The signal MEM_B received by the circuit 106 may carry the input operand data values of the array B.

A signal (e.g., A_VALUE) may be generated by the circuit 104 and received by the circuit 108. The signal A_VALUE may transfer fetched array A data (e.g., the fetched input data values of array A). A signal (e.g., B_VALUE) may be generated by the circuit 106 and transferred to the circuit 108. The signal B_VALUE may carry fetched array B data (e.g., the fetched input data values of array B). A signal (e.g., OUT) may be generated and presented by the circuit 108. The signal OUT may convey output data values (e.g., an array C) of a result (e.g., a dot product, a matrix multiplication, etc.) of the generalized dot-product operation performed by the circuit 100.

The circuit 102 is generally operational to setup, control and provide centralized scheduling for the operations in the circuit 104 and the circuit 106. The setup, control and scheduling may be provided by the control information presented in the signal CTL. Feedback for the operations in the circuit 104 and the circuit 106 may be presented back to the control circuit 102 in the signal CTL.

In various embodiments, the pipeline circuit 104 may operate on array data. The pipeline circuit 104 may be configured to fetch the input data values of the first array from the memory circuit 92 in the signal MEM_A. The fetched array data may be presented in the signal A_VALUE to the circuit 108. The pipeline circuit 104 generally comprises a block (or circuit) 150, a block (or circuit) 151, a block (or circuit) 152, a block (or circuit) 153, a block (or circuit) 154, and a block (or circuit) 155. In various embodiments, the circuits 150-155 may be implemented solely in hardware. The circuit 150 may exchange the signal CTL with the circuit 102. The circuit 151 may generate the signal ADDR_A. The signal MEM_A may be received by the circuit 152. The signal A_VALUE may be generated by the circuit 155.

The circuit 106 may implement a second pipeline circuit. In various embodiments, the pipeline circuit 106 may operate on array data. The pipeline circuit 106 may be configured to fetch the data values of the array B received from the memory circuit 92 via the signal MEM_B. The fetched array B data may be presented in the signal B_VALUE to the circuit 108. The pipeline circuit 106 generally comprises a block (or circuit) 160, a block (or circuit) 161, a block (or circuit) 162, a block (or circuit) 163, a block (or circuit) 164, and a block (or circuit) 165. In various embodiments, the circuits 160-165 may be implemented solely in hardware. The circuit 160 may exchange with signal CTL with the circuit 108. The circuit 161 may generate the signal ADDR_B. The signal MEM_B may be received by the circuit 162. The signal B_VALUE may be generated by the circuit 165.

The circuit 108 may implement a mathematics calculation circuit. The circuit 108 is generally operational to multiply and accumulate the fetched input data received in the signal A_VALUE with the fetched input data received in the signal B_VALUE. The resulting output data may be presented in the signal OUT.

Each of the circuits 150 and 160 may implement an iteration (ITER) circuit. The iteration circuits 150 and 160 are generally operational to generate respective sequences of values used in the current generalized dot-product operation. In an initial part of a generalized dot-product operation, the iteration circuits 150 and 160 generate an output array to be produced. Next, each input array may be broken down into a sequence of input values used to produce the output array. The iteration circuits 150 and 160 may communicate with the control circuit 102 to make sure that data is available before proceeding. The availability of the data generally avoids pipeline hangs and keeps the two pipelines 104 and 106 in synchronization.

Each of the circuits 151 and 161 may implement an address generator (AGEN) circuit. The address generators 151 and 161 may be operational to initiate data fetches received from the memory circuit 92 via the signals MEM_A and MEM_B into a local buffer 154 and/or a local buffer 164, respectively. The address generator 151 may present addresses in the signal ADDR_A for fetching the input data of array A. The address generator 161 may present addresses in the signal ADDR_B for fetching the input data of array B. The address generators 151 and 161 may also keep track of what data is in the local buffers 154 and 164, and annotate each array coming in with appropriate buffer location information. The address generators 151 and 161 generally achieve dimensional transposition by doing address translation when generating the signals ADDR_A and ADDR_B. The actual dimensional transposition may be performed by the memory 92 returning the data carried by the signals MEM_A and MEM_B according to the addresses ADDR_A and ADDR_B.

Each of the circuits 152 and 162 may implement a buffer write (BWR) circuit. The buffer write circuits 152 and 162 are generally operational to (i) receive data from the memory circuit 92 via the signals MEM_A and MEM_B and (ii) write the received data into the respective local buffer circuit 154 and 164 at the appropriate locations.

Each of the circuits 153 and 163 may implement a buffer read (BRD) circuit. The buffer read circuits 153 and 163 are generally operational to read data out of the respective local buffer or buffers 154 and 164. The local buffers 154 and 164 generally reduce bandwidth to the memory 92. The address generators 151 and 161 suppress fetching of data that is already present in the local buffers 154 and 164.

Each of the circuits 154 and 164 may implement a local buffer (BUF) circuit. The local buffer circuits 154 and 164 are generally operational to temporarily store (or buffer) the data written by the buffer write circuits 152 and 162, respectively. In some embodiments, the local buffers 154 and 164 may implement a random access capability.

Each of the circuits 155 and 165 may implement a read data (RDAT) circuit. The read data circuits 155 and 165 are generally operational to send the data read out of the respective pipelines 104 and 106 to the mathematics circuit 108. Both of the read data circuits 155 and 165 may replicate the array data. The dimensional upconversion of the operand arrays to match dimensions is realized by the replication process. The data stored in the local buffers 153 and 163 is generally post dimensional transposition, but pre dimensional upconversion. The read data circuit 155 may transfer the buffered input data values of the first array A in the signal A_VALUE. The read data circuit 165 may transfer the buffered input values of the second array B in the signal B_VALUE. The read data circuits 155 and 165 may also replicate the array data as appropriate.

In an example, the address generation performed in the address generators 151 and 161 generally operates using upconverted/transposed array dimensions. While generating a fetch request in the address generators 151 and 161, if a dimension is upconverted, the corresponding memory request coordinate may be set to 0 and size may be set to 1. Then, if the dimensions have been reordered, the request coordinates/sizes may be correspondingly reordered as well. Also, while reading out data using the buffer read circuits 153 and 163, if a dimension was upconverted, the coordinate is correspondingly set to 0 while determining the location in the local buffer from which to read.

Figure 3:
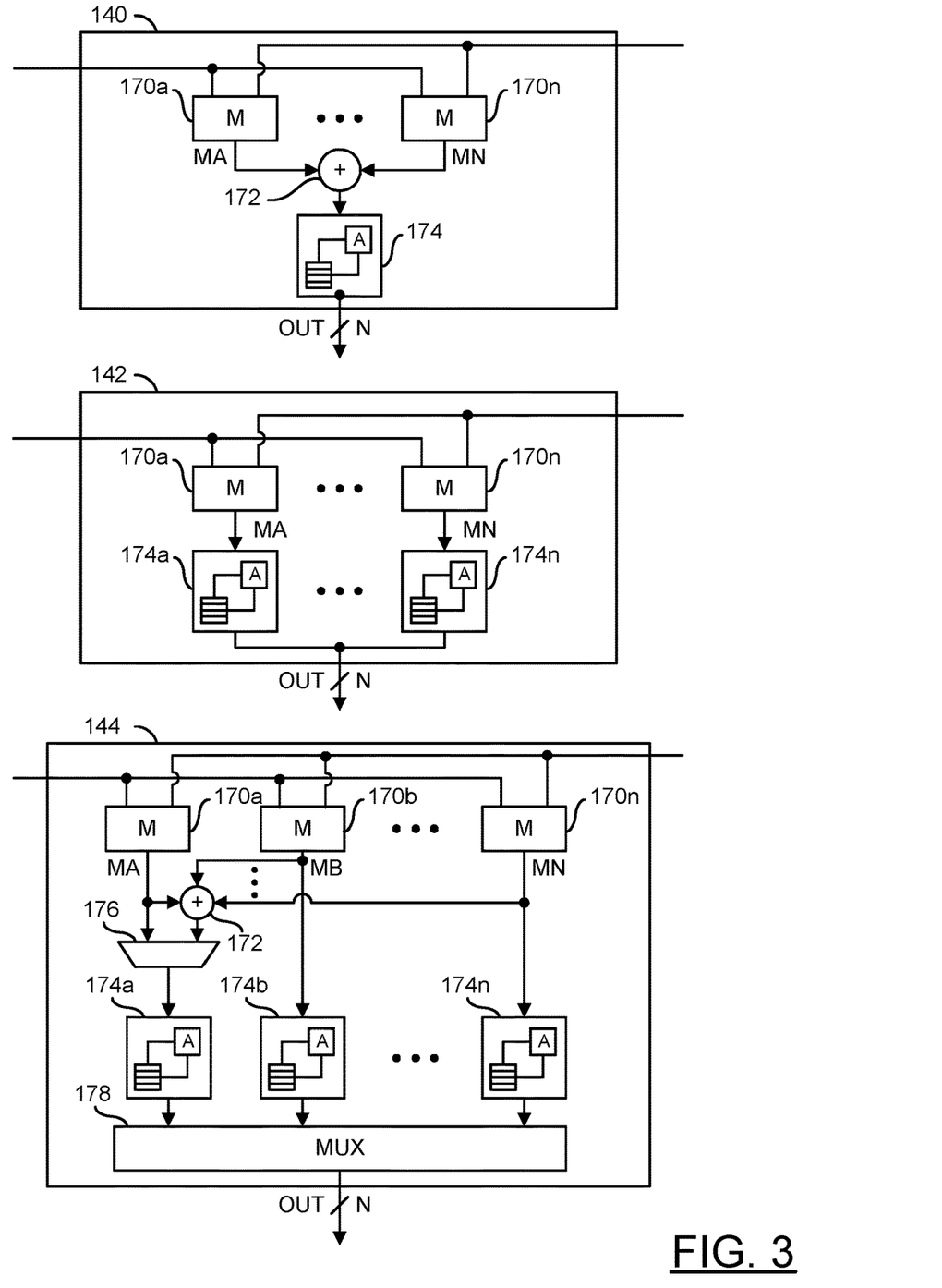
FIG. 3 is a diagram illustrating example implementations of a math circuit of FIG. 2.

Referring to FIG. 3, a diagram is shown illustrating three example implementations (140, 142 and 144) of a mathematics circuit in accordance with example embodiments of the invention. In some embodiments, the circuit 140 may be used to implement the circuit 108 of FIG. 2. The circuit 140 may comprise multiple blocks (or circuits) 170a to 170n, a block (or circuit) 172, and a block (or circuit) 174. The circuits 170a-170n, 172 and 174 may be implemented solely in hardware. Multiple signals (e.g., MA-MN) may be generated by the circuits 170a-170n and presented to inputs of the circuit 172. The signals MA-MN may carry intermediate results (e.g., products). The circuit 172 may combine (e.g., sum) the signals MA-MN and present a result (e.g., a sum of products) to the circuit 174. The circuit 174 may be configured to accumulate the results received from the circuit 172 and present the signal OUT in response to the results received from the circuit 172.

In some embodiments, the circuit 142 may be used to implement the circuit 108 of FIG. 2. The circuit 142 may comprise multiple blocks (or circuits) 170a to 170n and multiple blocks (or circuits) 174a to 174n. In various embodiments, the circuits 170a-170n and 174a-174n may be implemented solely in hardware. Multiple signals (e.g., MA-MN) may be generated by the circuits 170a-170n and presented to the circuits 174a-174n, respectively. The signals MA-MN may carry intermediate results. The signal OUT may be generated collectively by the circuits 174a-174n.

In some embodiments, the circuit 144 may be used to implement the circuit 108 of FIG. 2. The circuit 144 may comprise multiple blocks (or circuits) 170a to 170n, a block (or circuit) 172, multiple blocks (or circuits) 174a to 174n, a block (or circuit) 176, and a block (or circuit) 178. In various embodiments, the circuits 170a-170n, 172, 174a-174n, 176, and 178 may be implemented solely in hardware. Multiple signals (e.g., MA-MN) may be generated by the circuits 170a-170n and presented to inputs of the circuit 172. The signals MA-MN may carry intermediate results. The signal MA and an output of the circuit 172 may be presented to respective inputs of the circuit 176. The signals MB-MN may be presented to inputs of the circuits 174b-174n. The circuit 176 may be configured (programmed) to present either the signal MA or the output of the circuit 176 to an input of the circuit 174a. The circuit 178 may be configured to determined which outputs of the circuits 174a-174n are used to generate the signal OUT.

Each of the circuits 170a-170n may implement a multiplier circuit. The multiplier circuits 170a-170n are generally operational to multiply an array B value received in the signal B_VALUE with a corresponding array A value received in the signal A_VALUE. The mathematics circuit 108 may implement multiple parallel (e.g., 12-20) multiplier circuits 170a-170n. Each multiplier circuit 170a-170n may be configured to handle multi-bit (e.g., X=8-bit) input values. Some of the multiplier circuits 170a-170n (e.g., lower eight multipliers) may also be configured to handle wider (e.g., Y=16-bit) input values. As such, the generalized dot-product operation circuit 100 may operate on either X×Y bits (e.g., 8×16 bits) or Y×X bits (e.g., 16×8 bits) of data per clock cycle, trading off precision for performance. In embodiments having 16 multiplier circuits 170a-170n with 8 bits per word, a width N of the signals A_VALUE and B_VALUE may be 128 bits.

The circuit 172 may implement an adder tree. The adder tree circuit 172 is generally operational to sum the products (e.g., the signals MA-MN) of the input data values of the array A and the input data values of the array B. The circuit 174 and each of the circuits 174a-174n may implement an accumulator circuit. The accumulator circuits 174 and 174a-174n are generally operational to accumulate products of the multiplications of the input data values of the array A and the input data values of the array B, or a sum of the products. Each accumulator circuit 174 and 174a-174n generally stores the state for multiple (e.g., 8) separate (e.g., parallel or simultaneous) accumulations. The separate accumulations may allow sharing of accumulation logic.

The mathematics circuit 108 generally implements the logic needed to do parallel accumulation in the tiled mode and/or the adder tree used for the streaming mode. In various embodiments, the mathematics circuit 108 may implement multiple parallel (e.g., 12-20) accumulator circuits 174a-174n with an adder (A) in each of the accumulator circuits. Each of the accumulator circuits 174a-174n may be configured to handle multi-bit (e.g., X=8-bit) data values. Some of the accumulator circuits 174a-174n (e.g., lower eight accumulators) may also be configured to handle wider (e.g., Y=16-bit) data values. As such, the generalized dot-product operation circuit 100 may operate on either X×X (e.g., 8×8 bits), X×Y bits (e.g., 8×16 bits), Y×X bits (e.g., 16×8 bits) or Y×Y (e.g., 16×16 bits) of data per clock cycle. In embodiments having 16 accumulator circuits 174a-174n with 8 bits per word, a width N of the signal OUT may be 128 bits. In various embodiments, the multiplier circuits, the adder circuits, and the accumulator circuits of the mathematics circuit 108 may be implemented as fixed point, floating point, or a combination thereof depending upon the design criteria of a particular implementation.

Figure 4:
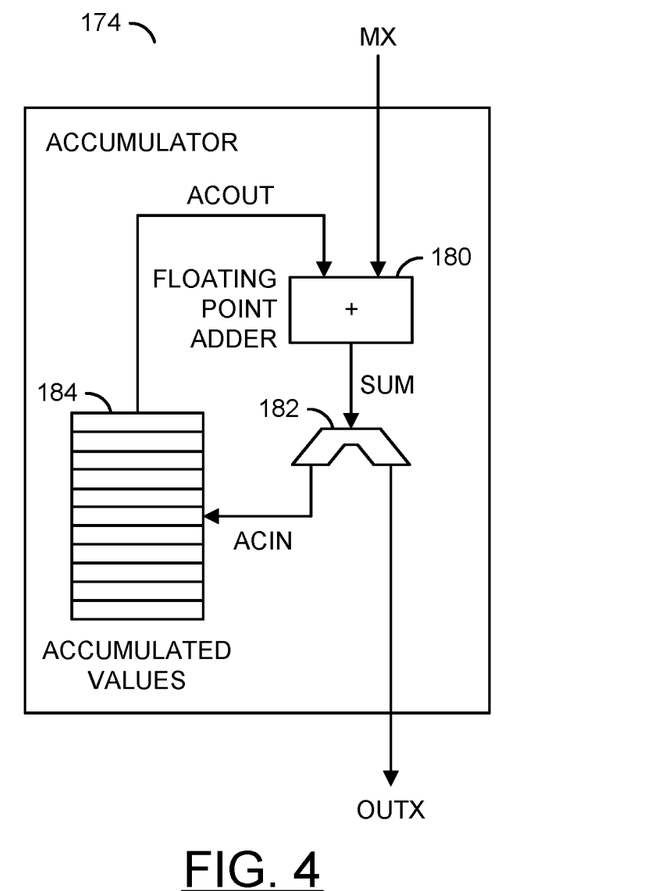
FIG. 4 is a diagram illustrating an example implementation of an accumulator of FIG. 3.

Referring to FIG. 4, a block diagram of an example implementation of an accumulator circuit 174 is shown. The accumulator circuit 174 may be representative of each of the accumulator circuits 174a to 174n. The accumulator circuit 174 generally comprises a block (or circuit) 180, a block (or circuit) 182 and a block (or circuit) 184. In various embodiments, the circuits 180-184 may be implemented solely in hardware.

A signal (e.g., MX) may be received by the circuit 174. The signal MX may be representative of each signal MA-MN or the sum of the signals MA-MN (see FIG. 3). The signal MX may convey the intermediate multiplication products from a corresponding multiplier circuit 170a-170n. A signal (e.g., ACOUT) may be generated by the circuit 184 and transferred to the circuit 180. The signal ACOUT may carry accumulated values read out of the circuit 184. The circuit 180 may generate a signal (e.g., SUM) received by the circuit 182. The signal SUM may carry a sum of the multiplication products received in the signal MX and the accumulated values received in the signal ACOUT. The circuit 182 may generate a signal (e.g., ACIN). The signal ACIN may carry the accumulated values being written into the circuit 184. A portion of the signal OUT (e.g., OUTX) may be generated by the circuit 182.

The circuit 180 may implement a floating point adder circuit. The floating point adder circuit 180 is generally operational to add the multiplier product values received in the signal MX with the accumulated values received in the signal ACOUT to calculate sum values. The sum values may be presented in the signal SUM.

The circuit 182 may implement a demultiplexer circuit. The demultiplexer circuit 182 is generally operational to route the sum values to the circuit 184 in the signal ACIN and in the output signal OUTX. While the accumulator circuit 174 is accumulating components of an output value in an output tile, the demultiplexer circuit 182 may route the intermediate accumulated values back to the circuit 184. Once all of the components of an output value in the output tile have been added together, the demultiplexer circuit 182 may route the final sum value to the signal OUTX as the calculated output value.

The circuit 184 may implement an accumulation register circuit. The accumulation register 184 is generally operational to buffer (or store) the intermediate accumulation values calculated by the floating point adder circuit 180 and received in the signal ACIN. The accumulation register 184 may also be operational to present the intermediate accumulation values back to the floating point adder circuit 180 in the signal ACOUT.

Figure 5:
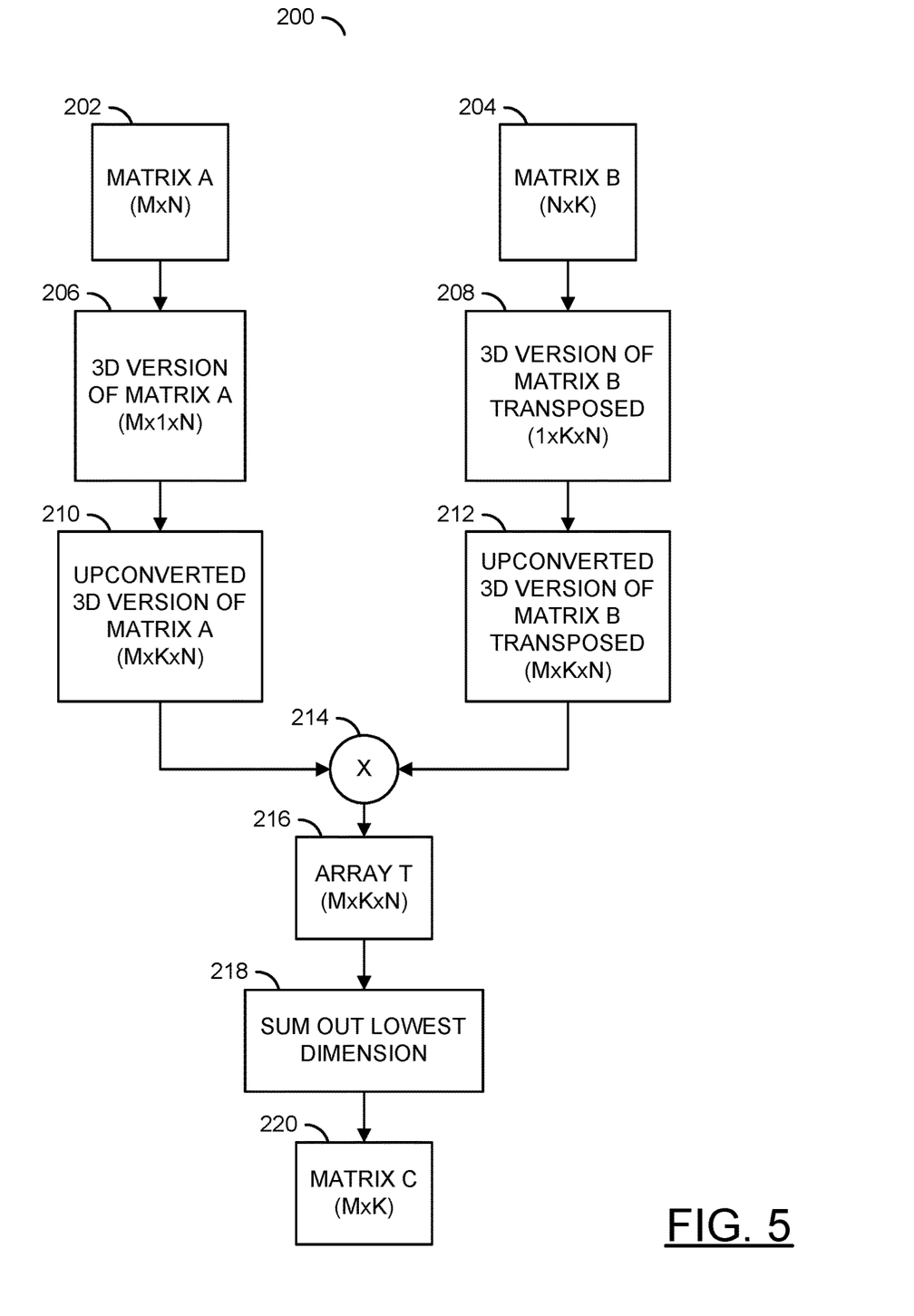
FIG. 5 is a diagram illustrating a matrix multiplication operation in accordance with an example embodiment of the invention.

Referring to FIG. 5, a diagram of a process 200 is shown illustrating a method of achieving a generalized multi-dimensional (ND) dot product operation in accordance with an example embodiment of the invention. The process 200 is illustrated using 3D arrays to simplify the description for clarity. The process (or method) 200 may comprise a step (or state) 202, a step (or state) 204, a step (or state) 206, a step (or state) 208, a step (or state) 210, a step (or state) 212, a step (or state) 214, a step (or state) 216, a step (or state) 218 and a step (or state) 220.

In various embodiments, the step 202 may fetch all or a portion of a first matrix (e.g., A) having dimensions M×N. The step 204 may retrieve all or a portion of a second matrix (e.g., B) having dimensions L×K from memory. The step 206 may translate the matrix A into a 3D array having dimensions M×1×N. The step 208 may convert the matrix B into a 3D array having dimensions 1×K×N, wherein the array generated in the step 208 is a transposed version of the matrix B from step 204. The step 210 may convert the array generated in the step 206 into a 3D array having dimensions M×K×N. The step 212 may convert the array generated in the step 208 into an array having dimensions M×K×N. The step 214 may multiply the 3D array from the step 210 with the 3D array generated within the step 212 element by element to generate a transitional (intermediate) array T having dimensions M×K×N. In the step 216, the intermediate array T is buffered in preparation for reduction. In the step 218 elements of the array T may be summed out over the lowest dimension to generate a resultant matrix (e.g., C) having dimensions M×K. In the step 220, the resulting matrix C is presented as the output of the process 200.

In various embodiments, the steps 202-212 may be implemented by generating addresses into a memory (e.g., memory 92) containing the matrices A and B to retrieve elements of the matrices A and B corresponding to each element of the converted arrays generated in the steps 210 and 212. Although the process 200 is illustrated as having separate steps 202, 206, and 210 and separate steps 204, 208, and 212, in implementation, the steps may be combined into an addressing scheme resulting in a simplified generation of the expanded dimension arrays without utilizing memory to store them. In one example, the generalized dot-product operation may be used to calculate matrix multiplication results useful in a computer vision system.

An example of the matrix multiplication operation using a generalized dot-product process in accordance with an example embodiment of the invention may be illustrated using a matrix A having dimensions (2×3) and a matrix B having dimensions (3×4). Given matrices A and B as follows:

$$A(2\times 3) = \begin{bmatrix} 1 & 2 & 3 \\ 4 & 5 & 6 \end{bmatrix} \text{ and } B(3\times 4) = \begin{bmatrix} 7 & 8 & 9 & 10 \\ 11 & 12 & 13 & 14 \\ 15 & 16 & 17 & 18 \end{bmatrix},$$

the generalized dot-product operation in accordance with an example embodiment of the invention may be illustrated by the following steps. In a first step, dimensional transposition is used to convert the matrix A to a 3-dimensional array A' having dimensions (2×1×3) and to convert the matrix B to a 3-dimensional array B' having dimensions (1×4×3). A list of 2D slices, which when stacked together form the 3D arrays A' and B', is presented in the following Table 1.

TABLE 1

| LAYER | A' (2 × 1 × 3) | B' (1 × 4 × 3) |
|---|---|---|
| 1 | [ 1 2 3 ] | [ 7 11 15 ] |
|   |   | [ 8 12 16 ] |
|   |   | [ 9 13 17 ] |
|   |   | [ 10 14 18 ] |
| 2 | [ 4 5 6 ] |   |

In a second step, a dimensional upconversion of the non-significant dimensions may be performed to equalize the dimensions of the two arrays. In the present example, array A' is converted to an array A" having dimensions (2×4×3) and array B' is converted to an array B" having dimensions (2×4×3). The dimensional upconversion of the non-significant dimensions may be accomplished through replication. A list of 2D slices, which when stacked together form the upconverted 3D arrays A" and B", is presented in the following Table 2:

TABLE 2

| LAYER | A" (2 × 4 × 3) | B" (2 × 4 × 3) |
|---|---|---|
| 1 | [ 1 2 3 ] | [ 7 11 15 ] |
|   | [ 1 2 3 ] | [ 8 12 16 ] |
|   | [ 1 2 3 ] | [ 9 13 17 ] |
|   | [ 1 2 3 ] | [ 10 14 18 ] |
| 2 | [ 4 5 6 ] | [ 7 11 15 ] |
|   | [ 4 5 6 ] | [ 8 12 16 ] |
|   | [ 4 5 6 ] | [ 9 13 17 ] |
|   | [ 4 5 6 ] | [ 10 14 18 ] |

In a next step, an intermediate result array T may be formed through element-wise multiplication, as illustrated in the following Table 3:

TABLE 3

| LAYER | T (2 × 4 × 3 ) |
|---|---|
| 1 | [ 1 * 7 2 * 11 3 * 15 ] |
|   | [ 1 * 8 2 * 12 3 * 16 ] |
|   | [ 1 * 9 2 * 13 3 * 17 ] |
|   | [ 1 * 10 2 * 14 3 * 18 ] |
| 2 | [ 4 * 7 5 * 11 6 * 15 ] |
|   | [ 4 * 8 5 * 12 6 * 16 ] |
|   | [ 4 * 9 5 * 13 6 * 17 ] |
|   | [ 4 * 10 5 * 14 6 * 18 ] |

Evaluation of the intermediate result array T is illustrated in the following Table 4:

TABLE 4

| LAYER | T (2 × 4 × 3) |
|---|---|
| 1 | [ 7 22 45 ] |
|   | [ 8 24 48 ] |
|   | [ 9 26 51 ] |
|   | [ 10 28 54 ] |
| 2 | [ 28 55 90 ] |
|   | [ 32 60 96 ] |
|   | [ 36 65 102 ] |
|   | [ 40 70 108 ] |

A final result array C may then be obtain through reduction. The reduction step may be seen as a two-step process. In a first step, the lowest dimension is summed up. In a second step, all dimensions are shifted down to remove the insignificant lowest dimension. Summing up the elements over the lowest dimension is illustrated in the following Table 5:

TABLE 5

| LAYER | C (2 × 4 × 1) |
|---|---|
| 1 | [ 7 + 22 + 45 ] |
|   | [ 8 + 24 + 48 ] |
|   | [ 9 + 26 + 51 ] |
|   | [ 10 + 28 + 54 ] |
| 2 | [ 28 + 55 + 90 ] |
|   | [ 32 + 60 + 96 ] |
|   | [ 36 + 65 + 102 ] |
|   | [ 40 + 70 + 108 ] |

Shifting the dimensions down to remove the insignificant lowest dimension then evaluates to:

$$C(2 \times 4) = \begin{bmatrix} 74 & 80 & 86 & 92 \\ 173 & 188 & 203 & 218 \end{bmatrix}.$$

Figure 6:
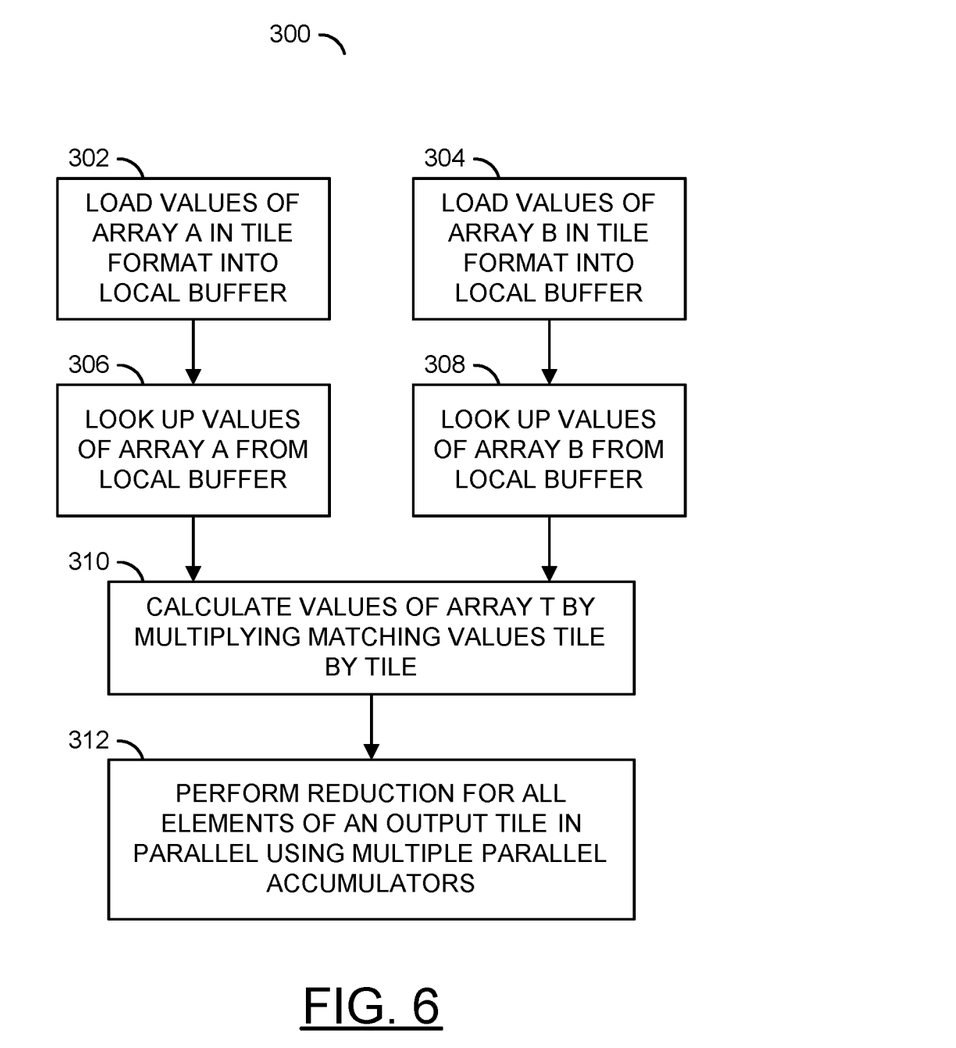
FIG. 6 is a diagram illustrating a tiled mode of the generalized dot-product operation in accordance with an example embodiment of the invention.

Referring to FIG. 6, a diagram of a process 300 is shown illustrating a tiled mode of the generalized dot-product operation in accordance with an example embodiment of the invention. The process 300 may comprise a step (or state) 302, a step (or state) 304, a step (or state) 306, a step (or state) 308, a step (or state) 310, and a step (or state) 312. The step 302 generally comprises loading values of a first array (e.g., A) in a tiled format into a local buffer. The step 304 generally comprises loading values of a second array (e.g., B) in the tiled format into the same or a different local buffer. The entire arrays do not need to fit into the local buffer(s), but at least one tile is guaranteed to fit in the local buffer(s). The steps 306 and 308 generally comprise looking up values of the arrays A and B, respectively, from the local buffer(s). The step 310 generally comprises calculating values of an intermediate result (e.g., an array T) on a tile by tile basis. The step 312 generally comprises performing reduction for all elements of an output array or file (e.g., an array C) in parallel using, for example, multiple parallel accumulators of the circuit 100. In general, the tiles are read from the local buffer(s) and multiplied in parallel, then the products are accumulated in parallel.

Figure 7:
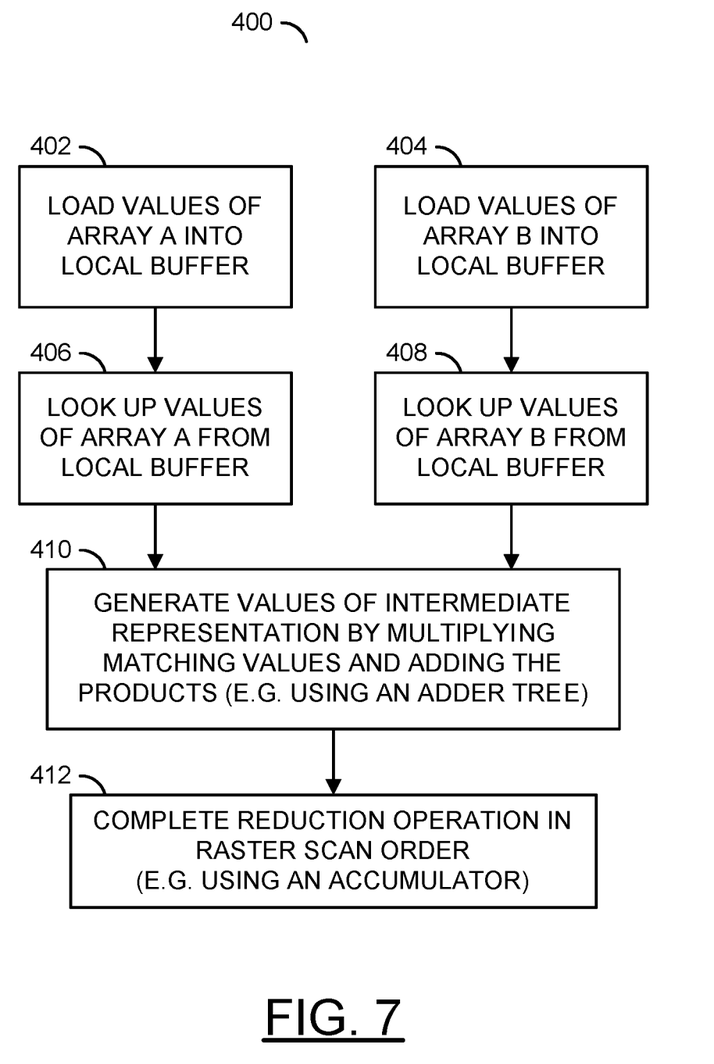
FIG. 7 is a diagram illustrating a dense streaming mode of the generalized dot-product operation in accordance with an example embodiment of the invention.

Referring to FIG. 7, a diagram of a process 400 is shown illustrating a non-sparse (dense) streaming mode of the generalized dot-product operation in accordance with an example embodiment of the invention. The process (or method) 400 may comprise a step (or state) 402, a step (or state) 404, a step (or state) 406, a step (or state) 408, a step (or state) 410, and a step (or state) 412. In the step 402, the process 400 may load values of a first array (e.g., A) into a local buffer. In the step 404, the process 400 loads values of a second array (e.g., B) in non-sparse (dense) format into the same or a different local buffer. The values of either or both arrays A and/or B may be received through a streaming process. In the steps 406 and 408, the process 400 looks up values of the arrays A and B, respectively, from the local buffer(s). In the step 410, the process 400 generates values of an intermediate result (e.g., products) by multiplying the corresponding values of array A with the values of array B, and adding the products (e.g., using an adder tree) into partial sums. In the step 412, the process 400 completes the reduction in raster scan order by accumulating the partial sums to obtain the result array C.

Figure 8:
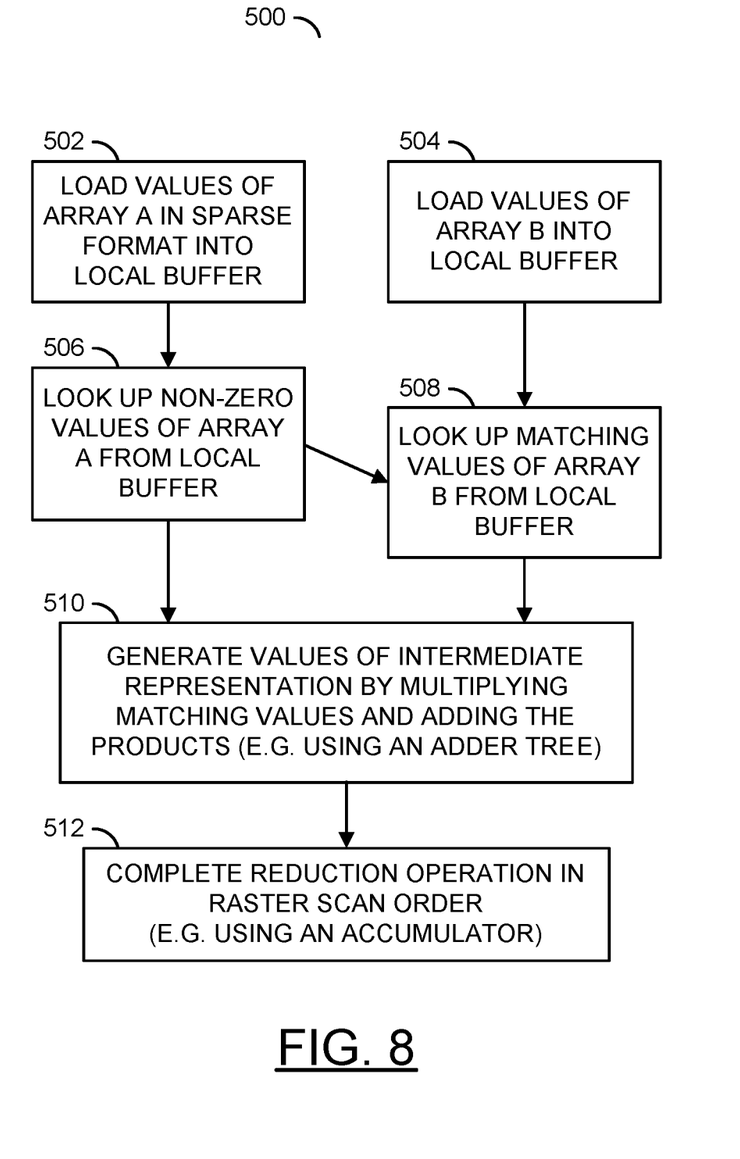
FIG. 8 is a diagram illustrating a sparse streaming mode of the generalized dot-product operation in accordance with an example embodiment of the invention.

Referring to FIG. 8, a diagram of a process 500 is shown illustrating a sparse streaming mode of the generalized dot-product operation in accordance with an example embodiment of the invention. The process (or method) 500 may comprise a step (or state) 502, a step (or state) 504, a step (or state) 506, a step (or state) 508, a step (or state) 510, and a step (or state) 512. In the step 502, the process 500 may load values of a first array (e.g., A) in sparse format into a local buffer. In the step 504, the process 500 loads values of a second array (e.g., B) into the same or a different local buffer. The sparse format generally comprises a count of zero values between two successive non-zero values of the array A. The storage requirements and bandwidth of the array A are generally reduced by replacing the zero values with the counts. The values of the arrays A and/or B may be received through a streaming process.

In the step 506, the process 500 looks up the non-zero values of the array from the local buffer. In the step 508, the process 500 looks up only the values of the array B corresponding to the non-zero values of the array A from the local buffer. In the step 510, the process 500 generates values of an intermediate result (e.g., array T) by multiplying the corresponding values of array B with the values of array A and adding the products (e.g., using an adder tree) to obtain partial sums. In the step 512, the process 500 further accumulates the partial sums from the step 510 to complete a reduction operation in raster scan order to obtain a result array C.

The two modes of operation, tiled and streaming, for the non-sparse (dense) generalized dot-product operation in accordance with an example embodiment of the invention may be illustrated using the dimensionally transposed versions of the operand arrays A' and B' from the example above. The following explanation assumes the operand arrays A' and B' are already available in the local buffer(s). For streaming mode, the eight output values would be generated in raster scan order in eight consecutive cycles. In each cycle, the three values from arrays A" and B" are fetched and the replication is done on-the-fly by replacing the coordinate for the upconverted dimension with 0 to generate the index into the arrays A' and B'.

The process may be illustrated as follows. In cycle 0, fetch A" (0, 0, 0 . . . 2) and B" (0, 0, 0 . . . 2) by fetching A' (0, 0, 0 . . . 2) and B' (0, 0, 0 . . . 2), then multiply and add to generate C(0, 0). In cycle 1, fetch A" (0, 1, 0 . . . 2) and B" (0, 1, 0 . . . 2) by fetching A' (0, 0, 0 . . . 2) and B' (0, 1, 0 . . . 2, then multiply and add to generate C(0, 1). In cycle 2, fetch A"(0, 2, 0 . . . 2) and B"(0, 2, 0 . . . 2) by fetching A' (0, 0, 0 . . . 2) and B' (0, 2, 0 . . . 2, then multiply and add to generate C(0, 2). In cycle 3, fetch A"(0, 3, 0 . . . 2) and B"(0, 3, 0 . . . 2) by fetching A' (0, 0, 0 . . . 2) and B' (0, 3, 0 . . . 2, then multiply and add to generate C(0, 3). In cycle 4: fetch A" (1, 0, 0 . . . 2) and B" (1, 0, 0 . . . 2) by fetching A' (1, 0, 0 . . . 2) and B' (0, 0, 0 . . . 2), then multiply and add to generate C(1, 0), In cycle 5, fetch A" (1, 1, 0 . . . 2) and B" (1, 1, 0 . . . 2) by fetching A' (1, 0, 0 . . . 2) and B' (0, 1, 0 . . . 2, then multiply and add to generate C(1, 1). In cycle 6, fetch A" (1, 2, 0 . . . 2) and B" (1, 2, 0 . . . 2) by fetching A' (1, 0, 0 . . . 2) and B' (0, 2, 0 . . . 2, then multiply and add to generate C(1, 2). In cycle 7, fetch A" (1, 3, 0 . . . 2) and B" (1, 3, 0 . . . 2) by fetching A' (1, 0, 0 . . . 2) and B' (0, 3, 0 . . . 2, then multiply and add to generate C(1, 3).

For the tiled mode, assuming the operation generates in 2×2 tiles, the left half of matrix C would be accumulated over 3 cycles using a 2×2 output buffer Q. Then the process would be repeated to generate the right half of matrix C over the next 3 cycles. For example, the process for the left half of array C may be illustrated as follows. In cycle 0, fetch A"(0 . . . 1, 0 . . . 1, 0) and B"(0 . . . 1, 0 . . . 1, 0) by fetching A' (0 . . . 1, 0, 0) and B'(0, 0 . . . 1, 0) and store in Q. In cycle 1, fetch A"(0 . . . 1, 0 . . . 1, 1) and B"(0 . . . 1, 0 . . . 1, 1) by fetching A'(0 . . . 1, 0, 1) and B'(0, 0 . . . 1, 1) and accumulate into Q. In cycle 2, fetch A"(0 . . . 1, 0 . . . 1, 2) and B"(0 . . . 1, 0 . . . 1, 2) by fetching A'(0 . . . 1, 0, 2) and B'(0, 0 . . . 1, 2) and accumulate into Q to generate C(0 . . . 1, 0 . . . 1).

The process would then be repeated to generate the right half of array C over the next 3 cycles. In cycle 3, fetch A"(0 . . . 1, 2 . . . 3, 0) and B"(0 . . . 1, 2 . . . 3, 0) by fetching A'(0 . . . 1, 0, 0) and B'(0, 2 . . . 3, 0) and store in Q. In cycle 4, fetch A"(0 . . . 1, 2 . . . 3, 1) and B"(0 . . . 1, 2 . . . 3, 1) by fetching A'(0 . . . 1, 0, 1) and B'(0, 2 . . . 3, 1) and accumulate into Q. In cycle 5, fetch A"(0 . . . 1, 2 . . . 3, 2)

and B"(0 . . . 1, 2 . . . 3, 2) by fetching A'(0 . . . 1, 0, 2) and B'(0, 2 . . . 3, 2) and accumulate into Q to generate C(0 . . . 1, 2 . . . 3).

Comparing the tiled mode to the streaming mode, the number of multiplications is the same (e.g., 24 in both cases), but the number of memory accesses from the local buffer(s) is different. For the streaming mode, 24 operands are fetched from both A' and B', whereas in the tiled mode only 12 operands are fetched from both A' and B'. In the streaming mode, the replication is achieved by repeatedly fetching from the local buffer, whereas in the tiled mode the replication is achieved by a combination of repeated fetching and replicating data when sending to the multiplier logic.

Figure 9:
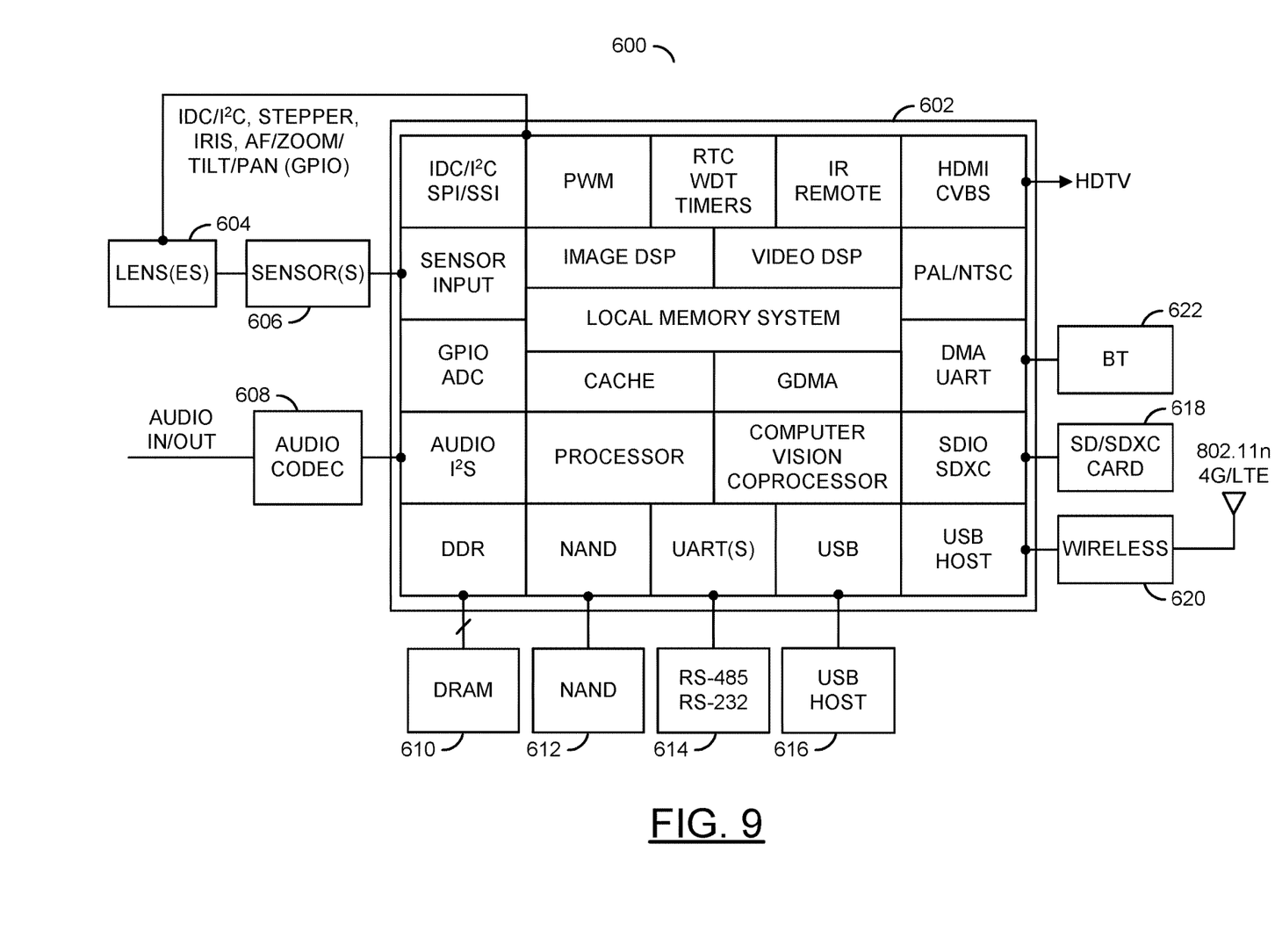
FIG. 9 is a diagram illustrating an example of a computer vision system in accordance with an example embodiment of the invention.

Referring to FIG. 9, a diagram of a camera system 300 is shown illustrating an example implementation of a computer vision system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300. In one example, the camera system 300 may comprise a processor/camera chip (or circuit) 302, one or more lens assemblies 304, one or more image sensors 306, an audio input/output circuit 308, which may include an optional audio codec, dynamic random access memory (DRAM) 312, non-volatile memory (e.g., NAND flash memory) 314, one or more serial interfaces 316, one or more universal serial bus (USB) interfaces for connecting to or acting as a USB host 318, an interface for connecting to a removable media 320 (e.g., SD, SDXC, etc.), a wireless interface 322, and a BLUETOOTH interface 324. In various embodiments, the wireless interface 322 and/or the USB Host 318 may be configured for communicating with a camera controller wirelessly.

The processor/camera circuit 302 generally incorporates hardware that may be configured to implement the processors and circuits described above in connection with FIGS. 1-4. The processor/camera circuit 302 may include a number of modules including a pulse width modulation (PWM) module, a real time clock, watch dog timer, and timers (RTC/WDT/TIMERS), an infrared (IR) remote interface, a high-definition multimedia interface (HDMI), a PAL/NTSC interface, a general purpose input/output (GPIO) and analog-to-digital converter (ADC) module, a direct memory access (DMA) universal asynchronous receiver transmitter (UART), a secure digital input/output (SDIO) and SD or xD (SDXC) card interface, an image sensor interface, and one or more of an inter-IC sound ($I^2S$) interfaces, an inter-IC control ($I^2C$) interface, and synchronous data communications interfaces (e.g., SPI, SSI, etc.). The circuit 302 may also include one or more embedded processors (e.g., ARM, etc.), a computer vision coprocessor, an encryption/decryption block, an image digital signal processor (DSP), a video DSP, a local memory system, a cache (e.g., L2CACHE), and a graphics direct memory access (GDMA) engine.

The circuit 302 may be configured (e.g., programmed) to control the one or lens assemblies 304 and the one or more image sensors 306. The circuit 302 may receive raw image data from the sensor 306. The circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The circuit 302 may receive encoded and/or uncoded (e.g., raw) audio data from the audio input 308. The circuit 302 may also receive encoded audio data from the USB and/or SDIO interfaces. The circuit 302 may provide encoded video data to the wireless interface 322 (e.g., using the USB host interface). The wireless interface 322 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The circuit 302 may also include support for communication using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured as a local buffer to store all or a portion of a first array of values and all or a portion of a second array of values; and
a circuit coupled to said memory and configured to (i) calculate an intermediate array of values by multiplying a converted version of said first array by a converted version of said second array and (ii) calculate an output array comprising a plurality of output values based on values of said intermediate array and a predefined dimensional reduction.

2. The apparatus according to claim 1, wherein said converted versions of said first and said second arrays are produced using one or more of dimensional upconversion and dimensional transposition.

3. The apparatus according to claim 1, wherein each of said first array, said second array and said output array comprises a multi-dimensional array of values.

4. The apparatus according to claim 1, wherein said first array comprises an N×M array of values, said second array comprises a K×N array of values, said converted version of said first array and said converted version of said second array comprise M×K×N arrays of values, and said output array comprises an M×K array of values, where K, N, and M are positive integer values.

5. The apparatus according to claim 1, wherein said second array is streamed in a sparse format for calculation of said intermediate array.

6. The apparatus according to claim 1, wherein said circuit further comprises:
a plurality of multipliers and a plurality of accumulators configured to generate accumulated products using tiles comprising a plurality of values in multiple dimensions.

7. The apparatus according to claim 6, wherein said circuit calculates said output values tile by tile, and reduction is performed for all elements of an output tile in parallel using multiple parallel accumulators.

8. The apparatus according to claim 1, wherein said circuit further comprises:
a plurality of multipliers, an adder tree, and one or more accumulators configured to generate accumulated partial sums of products in raster scan order.

9. The apparatus according to claim 8, wherein said circuit is further configured to stream a sparse second array and process only products with non-zero values of the sparse second array.

10. The apparatus according to claim 9, wherein said circuit is further configured to process the products simultaneously.

11. A method of calculating generalized multi-dimensional dot products, comprising the steps of:
calculating an intermediate array of values by multiplying a converted version of a first array of values by a converted version of a second array of values, wherein said converted versions of said first and said second arrays are produced using one or more of dimensional upconversion and dimensional transposition; and
calculating an output array comprising a plurality of output values based on values of said intermediate array and a predefined dimensional reduction.

12. The method according to claim 11, wherein:
all or a portion of said first array and all or a portion of said second array are stored in a local buffer; and
calculating said intermediate array comprises reading input tiles repeatedly from said local buffer to calculate an output tile.

13. The method according to claim 11, wherein calculating the output array further comprises summing up intermediate values over a lowest dimension or dimensions to obtain a lower dimensional result array.

14. The method according to claim 11, wherein each of said first array, said second array and said output array comprises a multi-dimensional array of values.

15. The method according to claim 11, wherein said first array comprises an N×M array of values, said second array comprises a K×N array of values, said converted version of said first array and said converted version of said second array comprise M×K×N arrays of values, and said output array comprises an M×K array of values, where K, N, and M are positive integer values.

16. The method according to claim 11, further comprising:
fetching said first array of values from a memory and loading said first array completely into a local buffer; and
streaming said second array in a sparse format for calculation of said intermediate array.

17. The method according to claim 11, further comprising:
selecting a streaming mode;
configuring a plurality of multipliers to generate a plurality of products;
configuring an adder tree to sum the products of said multipliers; and
configuring one or more accumulators to accumulate a plurality of sums of products from said adder tree to generate said output values.

18. The method according to claim 17, further comprising:
calculating said output values element by element, and performing reduction in raster scan order.

19. The method according to claim 11, further comprising:
- selecting a tiled mode;
- configuring a plurality of multipliers and a plurality of accumulators to generate accumulated products on a tile by tile basis using tiles comprising a plurality of values in multiple dimensions; and
- performing reduction for all elements of an output tile in parallel using multiple parallel accumulators.

20. The method according to claim 11, wherein said steps are performed in a computer vision system.

* * * * *